United States Patent
Burstein et al.

(10) Patent No.: US 11,410,072 B2
(45) Date of Patent: Aug. 9, 2022

(54) COMPUTER-IMPLEMENTED SYSTEMS AND METHODS FOR DETECTION OF SENTIMENT IN WRITING

(71) Applicant: Educational Testing Service, Princeton, NJ (US)

(72) Inventors: Jill Burstein, Princeton, NJ (US); Beata Beigman Klebanov, Hamilton, NJ (US); Joel Tetreault, Lawrenceville, NJ (US); Nitin Madnani, Princeton, NJ (US); Adam Faulkner, Brooklyn, NY (US)

(73) Assignee: Educational Testing Service, Princeton, NJ (US)

( * ) Notice: Subject to any disclaimer, the term of this patent is extended or adjusted under 35 U.S.C. 154(b) by 298 days.

(21) Appl. No.: 13/655,528

(22) Filed: Oct. 19, 2012

(65) Prior Publication Data

US 2013/0103623 A1 Apr. 25, 2013

Related U.S. Application Data

(60) Provisional application No. 61/582,593, filed on Jan. 3, 2012, provisional application No. 61/550,124, filed on Oct. 21, 2011.

(51) Int. Cl.
*G06N 20/00* (2019.01)
*G06N 5/02* (2006.01)
(Continued)

(52) U.S. Cl.
CPC ........... *G06N 20/00* (2019.01); *G06F 40/237* (2020.01); *G06N 5/022* (2013.01); *G06F 40/00* (2020.01); *G06N 5/04* (2013.01)

(58) Field of Classification Search
CPC ........ G06F 17/27; G06F 40/237; G06F 40/00; G06N 20/00; G06N 5/022; G06N 5/04
See application file for complete search history.

(56) References Cited

U.S. PATENT DOCUMENTS 5,497,319 A * 3/1996 Chong .................. G06F 40/242 707/999.001
7,519,528 B2 * 4/2009 Liu ....................... G06F 40/242 704/2

(Continued)

OTHER PUBLICATIONS

Maite Taboada, Caroline Anthony and Kimberly Voll, "Methods for Creating Semantic Orientation Dictionaries", Proceedings of Fifth International Conference on Language Resources and Evaluation (LREC 2006). Genoa, Italy., 2006, pp. 427-432.*

(Continued)

*Primary Examiner* — Michael J Huntley
*Assistant Examiner* — Oluwatosin O Alabi
(74) *Attorney, Agent, or Firm* — Jones Day

(57) ABSTRACT

Systems and methods are provided for the detection of sentiment in writing. A plurality of texts is received from a larger collection of writing samples with a computer system. A set of seed words from the plurality of texts are labeled as being of positive sentiment or of negative sentiment with the computer system. The set of seed words is expanded in size with the computer system to provide an expanded set of seed words. Intensity values are assigned to words of the expanded set of seed words. Each of the words of the expanded set of seed words is assigned three intensity values: a value corresponding to the strength of the word's association with a positive polarity class, a value corresponding to the strength of the word's association with a negative polarity class, and a value corresponding to the strength of the word's association with a neutral polarity class.

15 Claims, 10 Drawing Sheets

(51) Int. Cl.
G06N 5/04 (2006.01)
G06F 40/237 (2020.01)
G06F 40/00 (2020.01)

(56) References Cited

U.S. PATENT DOCUMENTS

| | | | | |
|---|---|---|---|---|
| 8,060,360 | B2* | 11/2011 | He | G06F 40/45 704/9 |
| 8,234,106 | B2* | 7/2012 | Marcu et al. | 704/2 |
| 9,672,555 | B1* | 6/2017 | Dillard | G06Q 30/0631 |
| 2003/0204400 | A1* | 10/2003 | Marcu | G06F 40/242 704/251 |
| 2004/0117367 | A1* | 6/2004 | Smith et al. | 707/5 |
| 2006/0173886 | A1* | 8/2006 | Moulinier | G06F 17/30616 |
| 2006/0190241 | A1* | 8/2006 | Goutte | G06F 17/2827 704/2 |
| 2008/0270116 | A1* | 10/2008 | Godbole | G06F 17/279 704/9 |
| 2009/0106018 | A1* | 4/2009 | Liu | G06F 17/2735 704/4 |
| 2009/0265307 | A1* | 10/2009 | Reisman et al. | 707/2 |
| 2010/0057432 | A1* | 3/2010 | Hua | G06F 17/2827 704/2 |
| 2010/0257117 | A1* | 10/2010 | Shvadron | G06F 17/30616 705/36 R |
| 2011/0131032 | A1* | 6/2011 | Yang | G06F 17/2818 704/2 |
| 2012/0046938 | A1* | 2/2012 | Godbole | G06F 17/279 704/9 |
| 2012/0259616 | A1* | 10/2012 | Peng | G06F 17/274 704/9 |

OTHER PUBLICATIONS

Taras Zagibalov, "Unsupervised and Knowledge-poor Approaches to Sentiment Analysis", published by University of Sussex, UK, phd Thesis, 2010, pp. 1-181.*
Karthik Raghunathan, "Simple Coreference Resolution with Rich Syntactic and Semantic Features: Is it enough?", published by Stanford University, US, master's Thesis, 2010, pp. 1-32.*
Theresa Ann Wilson, "Fine-grained subjectivity and sentiment analysis: recognizing the Intensity, Polarity, and Attitudes of Private states", published by University of Pittsburg, US, phd Thesis, 2008, pp. 1-197.*
Stefanie Nowak, Stefan Ruger, "How Reliable are Annotations via Crowdsourcing? A Study about Inter-annotator Agreement for Multi-label Image Annotation", The 11th ACM International Conference on Multimedia Information Retrieval (MIR), Mar. 29-31, 2010, Philadelphia, USA., 2010, pp. 1-11.*
Maite Taboada, Julian Brooke, Milan Tofiloski, Kimberly Voll, Manfred Stede, "Lexicon-Based Methods for Sentiment-Analysis", Journal Computational Linguistics, vol. 37, Issue 2, Jun. 2011, pp. 267-307.*
Andrea Esuli and Fabrizio Sebastiani, "Sentiwordnet: A Publicly Available Lexical Resource for Opinion Mining", Proceedings of LREC-06, the 5th Conference on Language Resources and Evaluation, 2006, pp. 417-422.*
Rodrigo Agerri, Ana Garcia-Serrano, "Q-WordNet: Extracting Polarity fromWordNet Senses", in Proceedings of the Seventh International Conference on Language Resources and Evaluation (LREC '10), 2010, pp. 2300-2305.*
Taboada M, Brooke J, Tofiloski M, Voll K, Stede M. Lexicon-based methods for sentiment analysis. Computational linguistics. Jun. 2011;37(2):267-307.*
Fang, G., Yu, H., & Nishino, F. (Oct. 2005). Web-based terminology translation mining. In International Conference on Natural Language Processing (pp. 1004-1016). Springer, Berlin, Heidelberg. (Year: 2005).*
Artstein, R., & Poesio, M. (2008). Inter-coder agreement for computational linguistics. Computational Linguistics, 34(4), 555-596. (Year: 2008).*

Potemkin, S. B., & Kedrova, G. E. (2011). Exploring Semantic Orientation of Adverbs. CDUD'11—Concept Discovery in Unstructured Data, 71. Jun. 2011 (Year: 2011).*
Fung, P., & Yee, L. Y. (Aug. 1998). An IR approach for translating new words from nonparallel, comparable texts. In 36th Annual Meeting of the Association for Computational Linguistics and 17th International Conference on Computational Linguistics, vol. 1 (pp. 414-420). (Year: 1998).*
Banea, C., Mihalcea, R., & Wiebe, J. (2011). Multilingual sentiment and subjectivity analysis. Multilingual natural language processing, 6, 1-19. (Year: 2011).*
Esuli, A., & Sebastiani, F. (May 2006). Sentiwordnet: A publicly available lexical resource for opinion mining. In LREC (vol. 6, pp. 417-422). (Year: 2006).*
Ponmuthuramalingam, P., & Devi, T. (2010). Effective dimension reduction techniques for text documents. International Journal of Computer Science and Network Security, 10(7), 101-109. (Year: 2010).*
Tala, F. (2003). A study of stemming effects on information retrieval in Bahasa Indonesia. (Year: 2003).*
Mellebeek, B., Benavent, F., Grivolla, J., Codina-Filba, J., Costa-Jussa, M. R., & Banchs, R. E. (Jun. 2010). Opinion mining of spanish customer comments with non-expert annotations on mechanical turk. In Proceedings of the NAACL HLT 2010 workshop on creating speech and language data with AMT (Year: 2010).*
Andreevskaia, Alina, Bergler, Sabine; Mining WordNet for a Fuzzy Sentiment: Sentiment Tag Extraction from WordNet Glosses; Proceedings of the EACL; pp. 209-216; 2006.
Bannard, Colin, Callison-Burch, Chris; Paraphrasing with Bilingual Parallel Corpora; Proceedings of the ACL; pp. 597-604; 2005.
Burstein, Jill, Pedersen, Ted; Towards Improving Synonym Options in a Text Modification Application; University of Minnesota Supercomputing Institute Research Report Series, UMSI 2010/165; 2010.
Burstein, Jill, Marcu, Daniel, Knight, Kevin; Finding the Write Stuff: Automatic Identification of Discourse Structure in Student Essays; Natural Language Processing, IEEE Intelligent Systems, 18(1); pp. 32-39; 2003.
Callison-Burch, Chris, Koehn, Philipp, Osborne, Miles; Improved Statistical Machine Translation Using Paraphrases; Proceedings of the Human Language Technology Conference of the NAACL; pp. 17-24; 2006.
Choi, Yejin, Cardie, Claire; Learning with Compositional Semantics as Structural Inference for Subsentential Sentiment Analysis; Proceedings of the 2008 Conference on Empirical Methods in Natural Language Processing; pp. 793-801; 2008.
Esuli, Andrea, Sabastiani, Fabrizio; Determining Term Subjectivity and Term Orientation for Opinion Mining; Proceedings of the EACL; pp. 193-200; 2006.
Godbole, Namrata, Srinivasaiah, Manjunath, Skiena, Steven; Large Scale Sentiment Analysis for News and Blogs; Proceedings of ICWSM; 2007.
Gyamfi, Yaw, Wiebe, Janyce, Mihalcea, Rada, Akkaya, Cem; Integrating Knowledge for Subjectivity Sense Labeling; Proceedings of the NAACL; 2009.
Hatzivassiloglou, Vasileios, McKeown, Kathleen; Predicting the Semantic Orientation of Adjectives; Proceedings of the ACL; pp. 174-181; 1997.
Hu, Minquing, Liu, Bing; Mining and Summarizing Customer Reviews; Proceedings of ACM SIGKDD International Conference on Knowledge Discovery and Data Mining; pp. 168-177; 2004.
Kamps, Jaap, Marx, Maarten, Mokken, Robert, De Rijke, Maarten; Using WordNet to Measure Semantic Orientation of Adjectives; Proceedings of LREC; 2004.
Kanayama, Hiroshi, Nasukawa, Tetsuya; Fully Automatic Lexicon Expansion for Domain-Oriented Sentiment Analysis; Proceedings of the 2006 Conference on Empirical Methods in Natural Language Processing; pp. 355-363; 2006.
Kim, Soo-Min, Hovy, Eduard; Determining the Sentiment of Opinions; Proceedings of COLING Conference; 2004.
Kauchak, David, Barzilay, Regina; Paraphrasing for Automatic Evaluation; Proceedings of the Human Language Technology Conference of the NAACL; pp. 455-462; 2006.

(56) References Cited

OTHER PUBLICATIONS

Koehn, Philipp; Europarl: A Parallel Corpus for Statistical Machine Translation; Proceedings of the Machine Translation Summit; pp. 79-86; 2005.
Lin, Dekang; Automatic Retrieval and Clustering of Similar Words; Proceedings of the 17th International Conference on Computational Linguistics (COLING-98); pp. 768-773; 1998.
Madnani, Nitin, Resnik, Philip, Dorr, Bonnie, Schwartz, Richard; Are Multiple Reference Translations Necessary? Investigating the Value of Paraphrased Reference Translations in Parameter Optimization; Proceedings of the 8th Conference of the Association for Machine Translation in the Americas (AMTA); pp. 143-152; 2008.
Madnani, Nitin, Dorr, Bonnie; Generating Phrasal and Sentential Paraphrases: A Survey of Data-Driven Methods; Computational Linguistics, 36(3); pp. 341-387; 2010.
Madnani, Nitin, Dorr, Bonnie; Generating Targeted Paraphrases for Improved Translation; ACM Transactions on Intelligent Systems and Technology; 2011.
Metzler, Donald, Dumais, Susan, Meek, Christopher; Similarity Measures for Short Segments of Text; Proceedings of the European Conference on Information Retrieval (ECIR); pp. 16-27; 2007.
Miller, George; WordNet: A Lexical Database for English; Communications of the ACM, 38(11); pp. 39-41; 1995.
Mohammad, Saif, Dunne, Cody, Dorr, Bonnie; Generating High-Coverage Semantic Orientation Lexicons from Overtly Marked Words and a Thesaurus; Proceedings of the 2009 Conference on Empirical Methods in Natural Language Processing; pp. 599-608; 2009.
Moilanen, Karo, Pulman, Stephen; Sentiment Composition; Proceedings of Recent Advances in NLP (RANLP); pp. 378-382; 2007.
Owczarzak, Karolina, Groves, Declan, Van Genabith, Josef, Way, Andy; Contextual Bitext-Derived Paraphrases in Automatic MT Evaluation; Proceedings of the Workshop on Statistical Machine Translation; pp. 86-93; 2006.
Pang, Bo, Lee, Lillian; A Sentimental Education: Sentiment Analysis Using Subjectivity Summarization Based on Minimum Cuts; Proceedings of the ACL; pp. 271-278; 2004.
Polanyi, Livia, Zaenen, Annie; Contextual Valence Shifters; Ch. 1 in Computing Attitude and Affect in Text: Theory and Applications, Wiebe et al. (Ed.); Springer, Dordrecht; pp. 1-10; 2006.
Popescu, Ana-Maria, Etzioni, Oren; Extracting Product Features and Opinions from Reviews; Proceedings of the HLT/EMNLP; pp. 339-346; 2005.
Quinlan, J. Ross; C4.5: Programs for Machine Learning; Morgan Kaufmann: San Mateo, CA; 1992.
Riezler, Stefan, Vasserman, Alexander, Tsochantaridis, Ioannis, Mittal, Vibhu, Liu, Yi; Statistical Machine Translation for Query Expansion in Answer Retrieval; Proceedings of the 45th Annual Meeting of the Association for Computational Linguistics (ACL'07); 2007.
Riloff, Ellen, Wiebe, Janyce; Learning Extraction Patterns for Subjective Expressions; Proceedings of the Empirical Methods in Natural Language Processing; pp. 105-112; 2003.
Strapparava, Carlo, Mihalcea, Rada; SemEval—2007 Task 14: Affective Text; Proceedings of the 4th International Workshop on Semantic Evaluations; pp. 70-74; 2007.
Strapparava, Carlo, Valitutti, Alessandro; WordNet—Affect: An Affective Extension of WordNet; Proceedings of LREC; pp. 1083-1086; 2004.
Taboada, Maite, Brooke, Julian, Tofiloski, Milan, Voll, Kimberly, Stede, Manfred; Lexicon-Based Methods for Sentiment Analysis; Computational Linguistics, 37(2); pp. 267-307; 2011.
Takamura, Hiroya, Inui, Takashi, Okumura, Manabu; Extracting Semantic Orientations of Words Using Spin Model; Proceedings of the 43rd Annual Meeting of the Association for Computational Linguistics; pp. 133-140; 2005.
Turney, Peter; Thumbs Up or Thumbs Down? Semantic Orientation Applied to Unsupervised Classification of Reviews; Proceedings of the 40th Annual Meeting of the Association for Computational Linguistics; pp. 417-424; 2002.
Turney, Peter, Littman, Michael; Measuring Praise and Criticism: Inference of Semantic Orientation from Association; ACM Transactions on Information Systems, 21(4); pp. 315-346; 2003.
Stone, Philip, Dunphy, Dexter, Smith, Marshall, Ogilvie, Daniel; The General Inquirer: A Computer Approach to Content Analysis; MIT Press; 1966.
Subasic, Pero, Huettner, Alison; Affect Analysis of Text Using Fuzzy Semantic Typing; IEEE-FS, 9; pp. 483-496; 2001.
Wiebe, Janyce, Mihalcea, Rada; Word Sense and Subjectivity; Proceedings of the 21st International Conference on Computational Linguistics and 44th Annual Meeting of the Association for Computational Linguistics; pp. 1065-1072; 2006.
Wiebe, Janyce, Wilson, Theresa, Cardie, Claire; Annotating Expressions of Opinions and Emotions in Language; Language Resources and Evaluation, 39(2-3); pp. 165-210; 2005.
Wilson, Theresa, Wiebe, Janyce, Hoffmann, Paul; Recognizing Contextual Polarity in Phrase-Level Sentiment Analysis; Proceedings of the Human Language Technology Conference and Conference on Empirical Methods in Natural Language Processing (HLT-EMNLP); pp. 347-354; 2005.
Wilson, Theresa, Wiebe, Janyce, Hwa, Rebecca; Just How Mad Are You? Finding Strong and Weak Opinion Clauses; Proceedings of AAAI-2004; 2004.
Yu, Hong, Hatzivassiloglou, Vasileios; Towards Answering Opinion Questions: Separating Facts From Opinions and Identifying the Polarity of Opinion Sentences; Proceedings of Empirical Methods in Natural Language Processing; pp. 129-136; 2003.
Zhou, Liang, Lin, Chin-Yew, Muntenau, Dragos Stefan, Hovy, Eduard; ParaEval: Using Paraphrases to Evaluate Summaries Automatically; Proceedings of the Human Language Technology Conference of the NAACL; pp. 447-454; 2006.
Theresa Wilson et al; "Recognizing Contextual Polarity in phrase-level sentiment analysis"; pp. 347-354; Oct. 2005; Association for Computational Linguistics; URL: http://dl.acm.org/citation.cfm?doid=1220575.1220619.†

\* cited by examiner
† cited by third party

| LEXICON | # WORDS | # WORDS IN T-1 | # WORDS IN T-2 | # WORDS IN T-3 |
|---|---|---|---|---|
| SEED LEXICON | 750 | 202 | 398 | 688 |
| RAW WN | 2929 | 546 | 957 | 1527 |
| RAW LIN | 2106 | 348 | 652 | 1119 |
| RAW PARA | 3437 | 771 | 1287 | 2022 |
| CLEANED WN | 1599 | 292 | 553 | 947 |
| CLEANED LIN | 1611 | 265 | 508 | 896 |
| CLEANED PARA | 1951 | 430 | 758 | 1266 |
| RAW WN + RAW LIN | 981 | 241 | 471 | 804 |
| RAW WN + RAW PARA | 1182 | 350 | 627 | 999 |
| RAW LIN + RAW PARA | 1162 | 267 | 515 | 876 |
| MPQA | 7629 | 261 | 518 | 1022 |
| GI | 4204 | 263 | 514 | 940 |

*Fig. 2*

| WORD | POS | NEG | NEU |
|---|---|---|---|
| *familiarize* | 0.7 | 0.0 | 0.3 |
| *fancy* | 1.0 | 0.0 | 0.0 |
| *logically* | 0.7 | 0.0 | 0.3 |
| *lone* | 0.0 | 1.0 | 0.0 |
| *ludicrous* | 0.03 | 0.93 | 0.03 |
| *mad* | 0.0 | 1.0 | 0.0 |
| *made* | 0.13 | 0.0 | 0.87 |
| *magic* | 0.8 | 0.0 | 0.2 |
| *magical* | 0.95 | 0.0 | 0.05 |
| *unequaled* | 0.45 | 0.1 | 0.45 |

*Fig. 3*

| DATASET | # SENTENCES |
|---|---|
| TRAINING-1 | 247 |
| TRAINING-2 | 482 |
| TRAINING-3 | 1631 |
| TEST | 281 |

Fig. 5

THE BEST THREE RUNS ARE BOLD-FACED AND MARKED WITH AN ASTERISK (*)

| LEXICON | TRAINING-1 | TRAINING-2 | TRAINING-3 |
|---|---|---|---|
| MAJORITY BASELINE | 0.390 | 0.390 | 0.390 |
| SEED LEXICON | 0.520 | 0.513 | 0.513 |
| RAW WN | 0.451 | 0.469 | 0.448 |
| RAW LIN | 0.455 | 0.448 | 0.469 |
| RAW PARA | 0.422 | 0.505 | 0.469 |
| CLEANED WN | 0.495 | 0.523 | 0.523 |
| CLEANED LIN | 0.538* | 0.505 | 0.491 |
| CLEANED PARA | 0.473 | 0.484 | 0.498 |
| RAW WN + RAW LIN | 0.545* | 0.505 | 0.491 |
| RAW WN + RAW PARA | 0.498 | 0.484 | 0.556* |
| RAW LIN + RAW PARA | 0.509 | 0.516 | 0.487 |
| MPQA | 0.520 | 0.538 | 0.542 |
| GI | 0.462 | 0.527 | 0.487 |

Fig. 6

| System | # of Features | Feature Descriptions |
|---|---|---|
| Baseline | 2 | • Feature 1: raw counts of words labeled as *positive* in lexicons (no intensity estimations)<br>• Feature 2: raw counts of words labeled as *negative* in lexicons (no intensity estimations) |
| Sums | 2 | • Feature 1: the sum of *positive* intensity estimation values for sentiment words<br>• Feature 2: the sum of *negative* intensity estimation values for sentiment words |
| Bins | 10 | • Feature 1: raw counts of words with intensity estimations: $0.0 >= x <= 0.2$ for *positivity*<br>• Feature 2: raw counts of words with intensity estimations: $0.2 > x <= 0.4$ for *positivity*<br>• Feature 3: raw counts of words with intensity estimations: $0.4 > x <= 0.6$ for *positivity*<br>• Feature 4: raw counts of words with intensity estimations: $0.6 > x <= 0.8$ for *positivity*<br>• Feature 5: raw counts of words with intensity estimations: $0.8 > x <= 1.0$ for *positivity*<br>• Feature 6: raw counts of words with intensity estimations: $0.0 >= x <= 0.2$ for *negativity*<br>• Feature 7: raw counts of words with intensity estimations: $0.2 > x <= 0.4$ for *negativity*<br>• Feature 8: raw counts of words with intensity estimations: $0.4 > x <= 0.6$ for *negativity*<br>• Feature 9: raw counts of words with intensity estimations: $0.6 =< x <= 0.8$ for *negativity*<br>• Feature 10: raw counts of words with intensity estimations: $0.8 =< x <= 1.0$ for *negativity* |

*Fig. 7*

ACCURACY OF SENTIMENT ASSIGNMENT

| MACHINE LEARNER | LEXICON | BASELINE | SUMS | BINS |
|---|---|---|---|---|
| C50 | SEED | 61.6 | 63.7 | 66.2 |
| | RAW PARA | 61.2 | 65.1 | 68.7 |
| | COMBINED | 58.4 | 61.2 | 70.80 |
| SVM | SEED | 61.57 | 62.28 | 64.77 |
| | RAW PARA | 58.72 | 65.12 | 67.97 |
| | COMBINED | 59.07 | 65.12 | 69.39 |
| LOGISTIC REGRESSION | SEED | 61.57 | 62.63 | 64.77 |
| | RAW PARA | 60.14 | 65.84 | 70.46 |
| | COMBINED | 56.94 | 65.84 | 69.75 |

Fig. 8

ACCURACY OF POLARITY ASSIGNMENT

| MACHINE LEARNER | LEXICON | BASELINE | SUMS | BINS |
|---|---|---|---|---|
| C50 | SEED | 51.2 | 56.6 | 58.7 |
| | RAW PARA | 45.9 | 61.6 | 64.1 |
| | COMBINED | 44.8 | 58.7 | 61.2 |
| SVM | SEED | 52.67 | 54.8 | 57.3 |
| | RAW PARA | 46.26 | 60.14 | 64.41 |
| | COMBINED | 49.82 | 57.65 | 65.12 |
| LOGISTIC REGRESSION | SEED | 54.45 | 55.52 | 58.36 |
| | RAW PARA | 51.25 | 58.36 | 61.57 |
| | COMBINED | 45.45 | 59.79 | 59.79 |

Fig. 9

COMPUTER-IMPLEMENTED SYSTEMS AND METHODS FOR DETECTION OF SENTIMENT IN WRITING

CROSS REFERENCE TO RELATED APPLICATIONS

This application claims priority to U.S. Provisional Patent Application No. 61/550,124, filed Oct. 21, 2011, entitled "Building Subjectivity Lexicons for Sentiment Analysis Systems for Use in Essay Scoring," and U.S. Provisional Application No. 61/582,593, filed Jan. 3, 2012, entitled "Computer-Implemented Systems and Methods for Detection of Sentiment in Writing," the entirety of both of which is incorporated by reference.

TECHNICAL FIELD

This disclosure relates generally to the detection of sentiment in writing and more particularly to the use of intensity values in sentence-level sentiment and polarity classification.

BACKGROUND

In the field of text analysis, it can be desirable to assess language conveying a person's opinion, or sentiment. For example, it is sometimes desirable to determine whether a sentence, phrase, or document is objective or subjective in nature. Similarly, for a sentiment-containing sentence, phrase, or document, determining the polarity of the sentiment (positive, negative, or neutral) and the strength of the polarity can be valuable. Such sentiment assessment can be useful in a number of different fields. For example, the assessment of sentiment in student and test-taker writing may be used to evaluate components of argumentation in essays. As another example, a company seeking to track product image may wish to find and monitor opinions voiced on the company's products.

SUMMARY

In accordance with the teachings herein, systems and methods are provided for the detection of sentiment in writing. In one embodiment, a computer implemented method of building a subjectivity lexicon with intensity values for each word of the lexicon includes the following steps. A plurality of texts is received from a larger collection of writing samples with a computer system. A set of seed words from the plurality of texts are labeled as being of positive sentiment or of negative sentiment with the computer system. The set of seed words is expanded in size with the computer system to provide an expanded set of seed words. Intensity values are assigned to words of the expanded set of seed words. Each of the words of the expanded set of seed words is assigned three intensity values: a value corresponding to the strength of the word's association with a positive polarity class, a value corresponding to the strength of the word's association with a negative polarity class, and a value corresponding to the strength of the word's association with a neutral polarity class.

As another example, a sentiment analysis system includes a machine learning system that is configured to accept a number of inputs and produce an output. The machine learning system includes a processing system and a memory. A training set of data comprising a group of sentences of pre-determined sentiment and sentiment polarity is a first input to the machine learning system. A subjectivity lexicon comprising a list of words and intensity values for each word in the list is a second input to the machine learning system. In the subjectivity lexicon, each word has an intensity value for a positive polarity class, a negative polarity class, and a neutral polarity class. A feature set comprising a list of criteria is a third input to the machine learning system. The list of criteria is used to instruct the machine learning system as to what parts of the training set and what parts of the subjectivity lexicon to use in generating the output. The machine learning system is configured to determine whether a sentence contains sentiment and the polarity of a sentiment-containing sentence.

BRIEF DESCRIPTION OF THE FIGURES

FIG. 2 is a table illustrating sizes of various exemplary lexicons created and number of times words from the various exemplary lexicons appear in training datasets.

FIG. 3 depicts a partial listing of words from an exemplary subjectivity lexicon, where each word of the lexicon is assigned intensity values for each of the three polarity classes.

FIG. 5 is a table summarizing sizes of three training sets and a test set used for performing an exemplary evaluation of lexicons without intensity values.

FIG. 6 is a table summarizing the accuracy of an exemplary sentence-level classification performed without intensity values, with respect to three training sets.

FIG. 7 is a table listing three exemplary feature sets used for training machine learning systems and their associated feature descriptions.

FIG. 8 is a table depicting accuracy results for an exemplary sentiment analysis system for performing a sentence-level sentiment assignment task, where intensity values were used.

FIG. 9 is a table depicting accuracy results for an exemplary sentiment analysis system for performing a sentence-level polarity assignment task, where intensity values were used.

DETAILED DESCRIPTION

This disclosure describes an exemplary sentiment analysis system for generating and using a subjectivity lexicon in document analysis. The sentiment analysis system is used to detect the presence of sentiment in a sentence, phrase, or document, the associated polarity of the sentiment (e.g., positive, negative, neutral), and the strength of the sentiment. Thus, the sentiment analysis system is used to determine, generally, the attitude of a writer towards a topic. A general application sentiment analysis system that is topic and genre independent and that can be used with any type of writing is desirable for document analysis. One application of such a general application system lies in the evaluation of test-taker and student writing. For example, a general application sentiment analysis system can be used to support the analysis of structured content in test-taker and student writing by helping to identify and evaluate components of argumentation in essays.

The sentiment analysis system disclosed here is a general application system that can be used in evaluating writing regardless of the topic or genre. The system can be used in tandem with a discourse analysis system to allow, for example, identification of the sentiment orientation in sentences that articulate the thesis statement of an essay. Similarly, the disclosed sentiment analysis system could also be used with a discourse analysis system to determine the existence of positive and negative orientations in essays written in response to the task of summarizing and evaluating contrasting opinions presented in test stimuli.

Building the sentiment analysis system involves two major activities: (1) creating a subjectivity lexicon with a high degree of effective coverage, and (2) using the subjectivity lexicon to evaluate the presence of sentiment in a sentence, the polarity of the sentiment, and the strength of the polarity. A subjectivity lexicon is a list of sentiment words labeled with information about the polarity of the word (positive, neutral, or negative). A subjectivity lexicon may also include information about the intensity of the polarity (e.g., strongly positive or weakly positive). Effective coverage refers to the degree to which the words of a given lexicon actually appear in texts (e.g., despite the sizable nature of a 10,000 word lexicon, the lexicon may have a low effective coverage if few of its 10,000 terms actually appear in texts). Although the disclosed sentiment analysis system focuses on sentence-level determinations, the teachings herein may also be used in a system for generating phrase-level or document-level determinations.

Figure 1A:
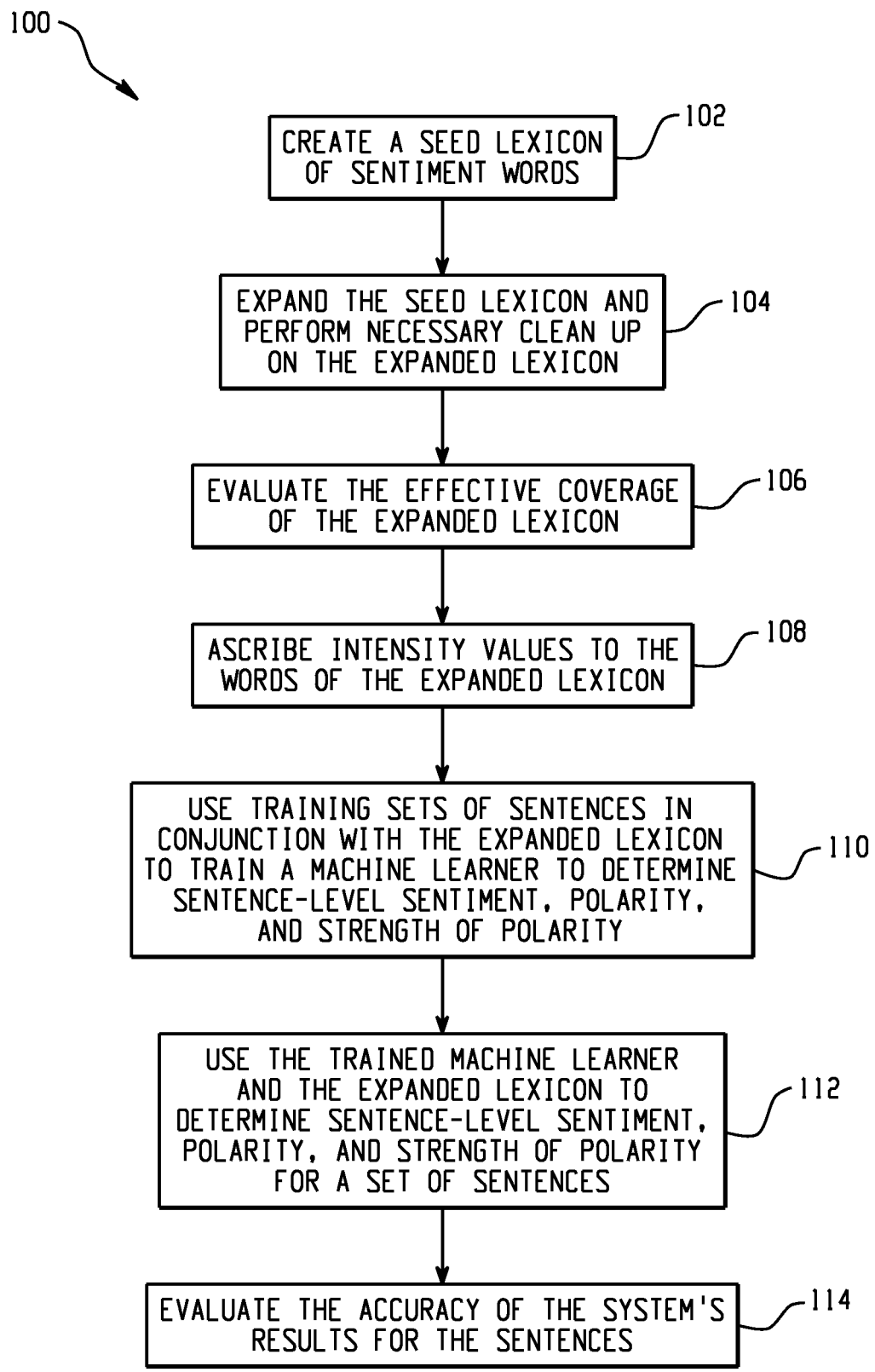
FIG. 1A depicts a flowchart illustrating an exemplary method for generating and using a subjectivity lexicon.

FIG. 1A depicts a flowchart illustrating an exemplary method for generating and using a subjectivity lexicon. The method can be carried out using any suitable computer processing system such as processing systems 1202, 1227, and 1254 illustrated in FIGS. 12A-12C herein. At 102, the processing system creates a seed lexicon of sentiment words. This seed lexicon can be created using automated methods and with manual assistance as described elsewhere herein. At 104, the processing system expands the size of the seed lexicon and performs any necessary filtering (clean-up) on the expanded lexicon to remove undesired words. This expansion is used to increase the effective coverage of the seed lexicon and may also be performed using a manual or automated method. Clean-up may be required for various reasons (e.g., to eliminate antonyms that are inadvertently produced in the expansion procedure or to eliminate words that do not match the tense of the seed word). At 106, the processing system evaluates the effective coverage of the expanded lexicon. Effective coverage refers to the degree to which the words of a given lexicon actually appear in one or more texts. At 108, the processing system assigns intensity values to the words of the expanded lexicon. Intensity values indicate the strength of a word's association to a particular polarity class. As described herein, intensity values for the words of the expanded lexicons may be derived using a crowdsourcing annotation method, wherein the amount of agreement between the manual annotations of different annotators is assessed by the processing system to derive intensity estimates for each polarity class for each word (e.g., inter-annotator agreement may be used to determine that the word "logically" has a POSITIVE intensity value of 70%, a NEGATIVE intensity value of 0%, and a NEUTRAL intensity value of 30%).

At 110, the processing system uses training sets of sentences in conjunction with the expanded lexicon to train a machine learning system to determine sentiment, polarity, and strength of polarity at the level of a sentence (sentence-level). After being trained, the machine learning system makes predictions based on known properties learned from the training data. Thus, in the present system, the machine learning system is presented with training sentences of pre-determined sentiment and polarity, and using these training sentences and the expanded lexicon, the machine learning system is able to infer known properties from the training data and use these properties in making predictions in the future. At 112, the processing system uses the trained machine learning system and expanded lexicon to determine sentence-level sentiment, polarity, and strength of polarity for a set of sentences (e.g., test sentences). At 114, the processing system evaluates the accuracy of the system's results for the sentences.

Building Subjectivity Lexicons

A core component of a sentiment analysis system is a subjectivity lexicon. Building a subjectivity lexicon with a high degree of effective coverage begins with the development of a smaller "seed" lexicon, which is then enlarged using one or more lexicon expansion mechanisms. Thus, the first step of building the subjectivity lexicon is to create a seed lexicon. To accomplish this, multiple (e.g., 5,000) essays may be randomly selected from a corpus of many (e.g., 100,000) essays containing writing samples across many topics. The essays may be responses to several different writing assignments, including graduate school entrance exams, non-native English speaker proficiency exams, and accounting exams. From these essays, positive and negative sentiment words are selected from the essays' text, manually or otherwise. These words constitute the baseline lexicon, which in the present example contains 407 words. This baseline lexicon is not the aforementioned seed lexicon, but it is used in creating the seed lexicon, as discussed below.

A seed lexicon can be created by adding to the baseline lexicon, as follows. From the sampled essays (e.g., 5,000 essays), multiple sentences containing at least one word from the baseline lexicon are selected, thus biasing the sample towards sentiment-bearing sentences. These selected sentences (e.g., 878 sentences in this example) are hereinafter referred to as "lexicon development sentences." This biasing is performed under the belief that the use of sentiment-bearing sentences is more effective for lexicon development. The selected (e.g., 878) sentences are manually annotated to denote sentence-level polarity. In this example, for instance, 248 of the lexicon development sentences were also manually annotated by persons to denote all words that contribute to the sentiment of the sentence or go against it (hereinafter "Annotation 1"). An example of Annotation 1 is as follows, where the sentence as a whole is annotated as positive, words contributing to the positive sentiment are bold-faced, and words going against it are underlined: "Some may even be impressed that we are confident enough to risk showing a lower net income."

Additional sentences (e.g., 247 sentences in this example) from a second dataset are manually annotated in a similar fashion using a crowdsourcing method (e.g., using the Amazon Mechanical Turk (AMT) website or the CrowdFlower website) to identify all words that contribute to the overall sentiment of the sentence. In the crowdsourcing method, each sentence may be assigned to five annotators, for example, and all words marked by at least three annotators are selected (hereinafter "Annotation 2").

Finally, the seed lexicon can be created by adding to the baseline lexicon all of the words marked in Annotation 1 and Annotation 2. A manual filtering (clean-up) to remove undesired words may then be performed. The resulting seed lexicon contains on the order of hundreds of words, e.g., 750 words in this example. The seed lexicon created in this example containing 750 words may be referred to herein as the "Seed Lexicon" using initial uppercase letters.

Having constructed the seed lexicon, the next step is to expand the seed lexicon so as to increase the size of the seed lexicon to include additional sentiment-containing words. Three expanded lexicons were created in this example using three different sources: (1) the Raw WN expanded lexicon was produced using the WordNet lexical database; (2) the Raw Lin expanded lexicon was produced using Lin's distributional thesaurus; and (3) the Raw Para expanded lexicon was produced using a broad coverage pivot-based paraphrase generation tool.

The Raw WN expanded lexicon was created as follows. The WordNet lexical database was used to extract the first three synonyms of the first sense of each word in the seed lexicon, restricting returned words to those of the same part-of-speech as the original word. This selection process produced strong synonym candidates without a large number of false positives.

The Raw Lin expanded lexicon was created as follows. Lin's proximity-based thesaurus was used with various essay data and also with well-formed newswire texts. All words with a proximity score greater than 1.80 for any of the seed lexicon words were included in the expansion. The proximity score was determined using the data contained within Lin's proximity-based thesaurus. Lin's proximity-based thesaurus contains entries for most of the words in the English vocabulary, and each entry contains a thesaurus entry word, followed by the 200 words determined to be "closest" to the thesaurus entry word. Each of the 200 words also has a proximity score, indicating the degree of the word's "closeness" to the thesaurus entry word. Thus, words with proximity scores greater than 1.80 for the seed words were determined by directly consulting the data contained within Lin's proximity-based thesaurus. The threshold proximity score of 1.80 was empirically determined. In particular, lower values produced a wealth of contextually-similar antonyms, which undermined the separation between positive and negative parts of the lexicon.

Figure 1B:
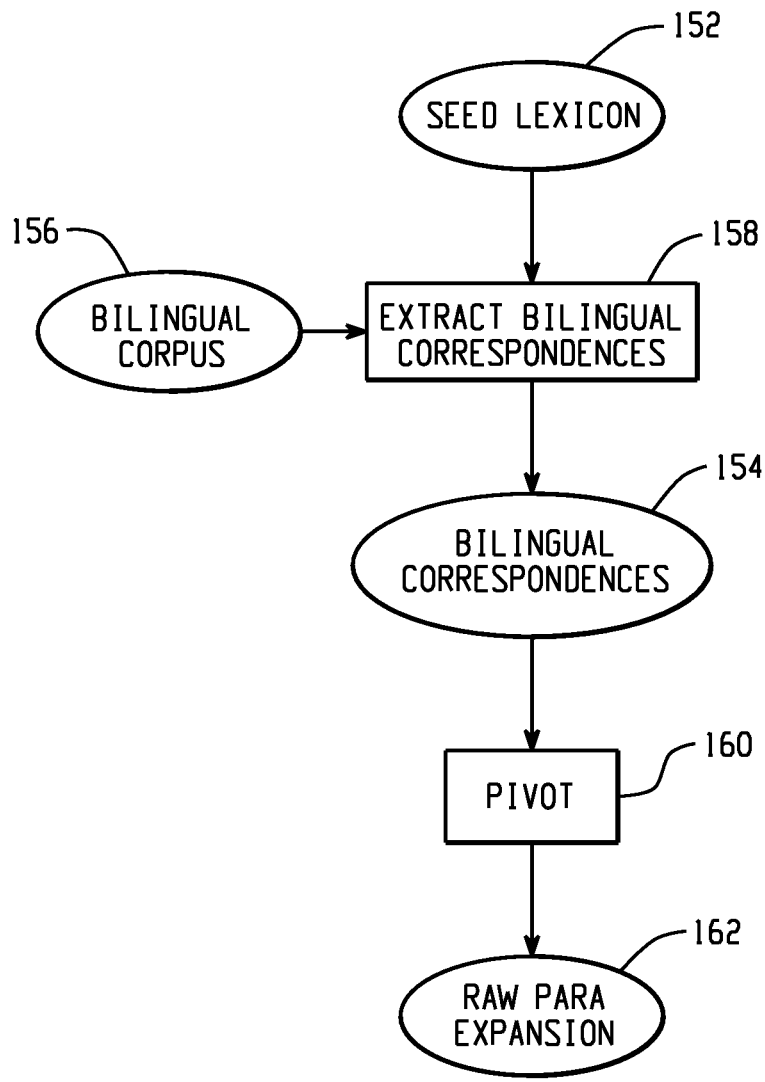
FIG. 1B is a flow diagram depicting a pivot-based lexical and phrasal paraphrase generation system for expanding the seed lexicon.

FIG. 1B is a flow diagram depicting a pivot-based lexical and phrasal paraphrase generation system for expanding the seed lexicon. The Raw Para expanded lexicon was created as follows. A pivot-based lexical and phrasal paraphrase generation system was used for this expansion. This system operates by using the generated seed lexicon 152 to extract bilingual correspondences 154 from a bilingual corpus, as indicated at 158, identifying phrases and words in Language A that correspond to the same phrase or word in the Language B, and finally pivoting, at 160 on the common phrase or word in order to extract all of the Language A words and phrases as paraphrases of each other to generate an expansion 162 of the seed lexicon 152. The French-English parallel corpus (approximately 1.2 million sentences) was used from the corpus of European parliamentary proceedings as the data on which pivoting was performed to extract the paraphrases. However, the base paraphrase system is susceptible to large amounts of noise due to the imperfect bilingual word alignments. Therefore, additional heuristics were implemented in order to minimize the number of noisy paraphrase pairs. For example, one such heuristic filters out any pairs where a function word may have been inferred as a paraphrase of a content word. Ultimately, the Raw Para lexicon expands the seed lexicon by using the top 15 single-word paraphrases for every word from the seed lexicon and excluding morphological variants of the seed lexicon word.

Having expanded the seed lexicon, the expanded lexicon is then filtered (cleaned up) to remove unwanted words. In this example, the three expanded lexicons were cleaned up as described below. The clean up procedure may be required for a variety of reasons (e.g., a given expansion method may result in the inclusion of an antonym of a seed word being included in the same polarity class as the seed word). Clean up may be performed manually or automatically.

Manual clean-up may be accomplished using a crowdsourcing method. Annotators can be asked to label the expanded lexicon words as positive, negative, or neutral. Each word can receive three annotations. Two filtering criteria can be used to generate the cleaned versions of the three expanded lexicons: (a) each word can be tagged as positive or negative polarity by the majority of the three annotators, and (b) the majority polarity can match the expected polarity of the word (the polarity of the word from the seed lexicon from which the current word had been generated). The clean-up procedure may result in a 35% to 45% reduction in the expanded lexicon sizes; however the cleaned lexicons are generally still at least twice the size of the seed lexicon.

Automatic clean-up may be accomplished through a method whereby the expanded lexicons are combined. This strategy is based on the assumption that the three exemplary mechanisms of expansion are sufficiently different to provide independent evidence of a word's relatedness to the seed word it was expanded from. Therefore, under this clean-up method, two expanded lexicons are combined, and the resulting, cleaned-up lexicon includes only the words that were found in both of the two expanded lexicons. Thus, the Raw WN+Raw Lin, Raw WN+Raw Para, and Raw Lin+Raw Para lexicons can be created in this manner. This procedure results in the elimination of up to 67% of the larger of the two raw lexicons. These automatically cleaned up lexicons are still 21% to 58% larger than the Seed Lexicon, thus providing significant expansion without human intervention.

FIG. 2 is a table illustrating the sizes of various exemplary lexicons created and the number of times words from the various lexicons appear in training datasets in the present example. The number of times that the words from a particular lexicon appear in training datasets is indicative of the effective coverage of the lexicon. Effective coverage is evaluated in order to determine if the expansion methods utilized were helpful in increasing the coverage over that of the seed lexicon. This question is especially pertinent to the expansion strategies that utilize corpus-independent material (such as the WordNet lexical database used to create the Raw WN lexicon) or out-of-domain material, like the paraphrase generation tool. Three training sets, T-1, T-2, and T-3 were used to evaluate effective coverage. In FIG. 2, the cleaned lexicons refer to expanded lexicons that were cleaned by the manual crowdsourcing method. FIG. 2 shows that even the most conservative expansion (Raw WN+Raw Lin) is 20% bigger than the Seed Lexicon and has 17% more coverage than the Seed Lexicon for the largest training set, T-3. Also included in FIG. 2 is data on the Multi-Perspective Question Answering (MPQA) and General Inquirer (GI) lexicons and their effective coverages. These lexicons are considered "gold-standard" lexicons. Both the manually and the automatically-cleaned lexicons are on par with the MPQA and GI lexicons in terms of effective coverage, even though they are at least 50% smaller in overall size.

Adding Intensity Values to the Subjectivity Lexicons

As indicated above, a subjectivity lexicon may contain not only a list of sentiment words but also intensity values that indicate the strength of the sentiment word's polarity. The use of intensity values recognizes that some words have a more strict membership to a polarity class, while others have a softer membership. Intensity values can also be used in evaluating not only the polarity of a sentence but also the strength of the polarity of the sentence. Examples of low intensity and high intensity words are, respectively, "support" and "accused."

At this point, the subjectivity lexicons described above consist of a list of words, with each word being associated with a single polarity class. These subjectivity lexicons are further augmented through the assignment of intensity values for each word. The sentiment analysis system described herein ascribes, for each word, numerical values for a word's "fit" within all three polarity classes (positive, negative, neutral). This assignment of three intensity values for each word is performed under the belief that that not all sentiment words are easily characterized as being within a single polarity class. For example, although the word "good" is clearly best characterized as being within the positive polarity class, some words are not as easily characterized as being within only one class (e.g., the word "logically"). Thus, the words of the lexicons described herein are seen as belonging to all three polarity classes, but to varying degrees or likelihoods.

Determining a word's fit within the three polarity classes is performed by evaluating the results of manual annotations: when annotators are tasked with placing a word into one of the three polarity classes, lower inter-annotator agreement about a word's sentiment may suggest that the word may not clearly fit within a single polarity class. To assign intensity values in this manner, a manual annotation can be performed via a crowdsourcing method.

In addition, multiple lexicons can be combined and annotated. In this example, all words from the Seed Lexicon, Raw WN, Raw Lin, and Raw Para lexicons (a combined 4900 words) were annotated by at least 20 annotators. Annotators were given instructions to assign a positive, negative, or neutral label to each word. Words were presented in isolation, without context. Instructions can be given as follows: "In this task, you will be shown a word. Your job is to label the word as positive, negative, or neutral. Positive words are used to describe something good, negative words are used to describe something bad, and neutral words are neither positive nor negative. For example, the words 'politeness,' 'lovely,' and 'fairness' are positive. The words 'attacked,' 'misgivings,' and 'insufficiently' are negative. The words 'say,' 'there,' and 'desk' are neutral."

For the crowdsourcing task, a set of gold-standard answers (i.e., words that have a very strong positive or negative polarity) are distributed among the larger set of words for the annotators to label in order to check the quality of assignments made by the annotators for those words. In crowdsourcing tasks, annotators may just randomly click on responses to earn money quickly and may not necessarily take the task seriously. To reduce the population of non-serious annotators, annotators must respond correctly to a high proportion of the gold-standard answers, or they are not allowed to complete the task. Annotators are shown words in sets of 10, and they may respond to as many sets of 10 as desired. Annotations are collected until at least 20 annotations per word are gathered. Data collection in this manner can take less than 8 hours.

Following annotation, the combined lexicon consists of all words from the subject lexicons. In this example, the combination of the Seed Lexicon, Raw WN, Raw Lin, and Raw Para lexicons yields a "COMBINED Lexicon" (4900 words total), with each word having intensity values for each of the three polarity classes. These intensity values were determined using the proportion of positive, negative, and neutral judgments from the 20 annotations.

FIG. 3 depicts a partial listing of words from an exemplary subjectivity lexicon, where each word of the lexicon is assigned intensity values for each of the three polarity classes.

Figure 4:
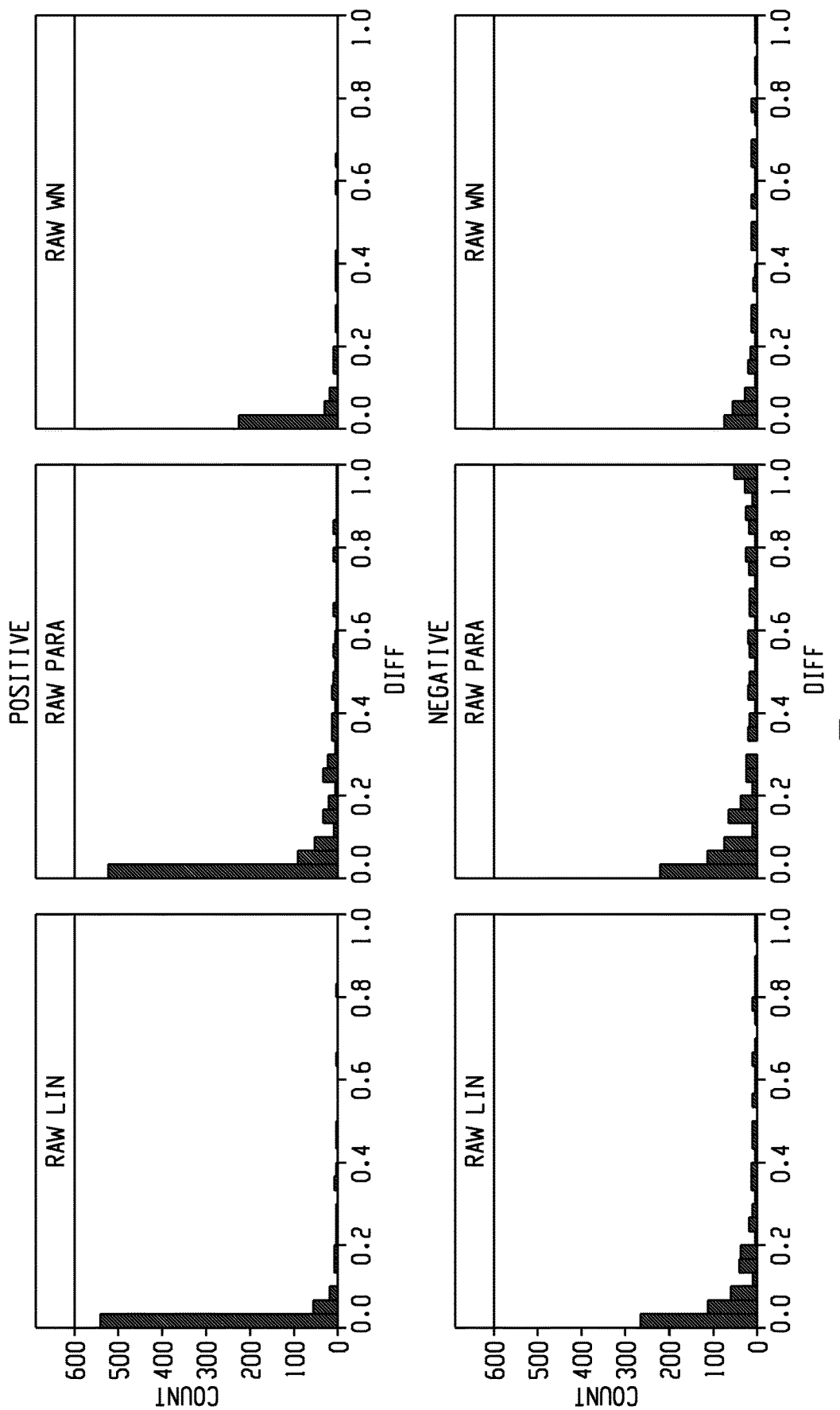
FIG. 4 is a graph depicting variation between words' nominally-identified polarity classes and annotators' assessment of the words' polarity classes for three exemplary expansion methods.

FIG. 4 is a graph depicting variation between words' nominally-identified polarity classes and annotators' assessment of the words' polarity classes for three exemplary expansion methods. As described above, each word, before the assignment of intensity values, was nominally identified as being positive or negative. If all annotators agreed on this assessment, a word was assigned an intensity value of 1.0 for the nominally-identified polarity class. A word with an intensity value of 1.0 would have a difference value on FIG. 4 of 0.0 within either the positive or negative portion of the graph, meaning that all annotators agreed on the nominally-identified polarity class. Words with higher difference values on FIG. 4 indicate words that had higher annotator disagreement with the nominal polarity assessment.

As described above, three different expansion methods were used to expand the seed lexicon in this example: the WordNet system, Lin's proximity-based thesaurus, and a Paraphrase Generation system. Each of the resulting lexicons, Raw WN, Raw Lin, and Raw Para, contain different distributions of intensity values, meaning that one method might have generated more expansion words that had harder membership within a particular polarity, while another method might have generated more expansion words that had softer membership across polarities. For instance, from FIG. 3, the word "fancy" would be considered as having hard (strict) membership to the positive polarity class, while the word "unequaled" has a softer membership in both the positive and negative polarity classes, and even some marginal membership to the neutral class. FIG. 4 thus depicts the amount of harder and softer membership words produced by the three expansion methods. Raw Para contained the largest number of expansions with the greatest range of intensity values.

FIG. 4 shows that in the case of words nominally identified as being positive, there was a generally harder membership, since most words have between 0.0 and 0.2 differences, although the Paraphrase Generation expansion method generated more cases of words with larger differences (softer membership). In the case of words nominally identified as being negative, there was a generally softer membership, and again, the Paraphrase Generation expansion method generated a larger number of softer membership cases than the other methods.

Sentence-Level Sentiment and Polarity Classification Using the Developed Lexicons At this point, with the subjectivity lexicons created and intensity values assigned, the quality of the lexicons for use in determining sentiment and sentiment polarity at the sentence-level can be evaluated. Two discrete evaluations can be performed. First, lexicons can be evaluated without the use of intensity values, using only their list of words and the words' associated polarity classifications. Second, lexicons can be evaluated using the assigned intensity values for each of the three polarity classes.

Both evaluations make use of machine learning techniques, whereby a machine learning system is trained to make predictions based on known properties learned from training data. The machine learning system can be implemented with a computer processing system as described herein. Thus, in training a machine learning system, the goal is to build a classification function from a set of training data. In the present case, the machine learning system is presented with training sentences of pre-determined sentiment and polarity. Using these training sentences and provided lexicons, the machine learning system is able to infer known properties from the training data and build a classification function. The classification function can then be used in predicting the sentiment and polarity in subsequent, unclassified test sentences.

Sentence-Level Classification Performed Without Intensity Values

It may be desirable to evaluate the subjectivity lexicons. For example, in one evaluation of the subjectivity lexicons, intensity values are not used. In this example, performing the evaluation requires the generation of training sentences and test sentences. As noted above, the training sentences are manually-annotated sentences that are used to train the machine learning system, while the test sentences are used to evaluate the lexicon and the trained machine learning system.

In this example, to generate the data for training and testing, 5,000 essays were selected from a pool of 100,000 essays, and from these 5,000 essays, 550 sentences were randomly selected. To create training sentences, these 550 sentences were manually annotated at the sentence level for the presence of sentiment and the polarity of the sentiment. Fifty of the sentences were annotated by two annotators, where a high inter-annotator agreement value (e.g., kappa value greater than 0.8) was sought to allow for more definite conclusions. The two annotators were in agreement regarding 43 out of the 50 sentences. Sentences labeled as incomprehensible or as containing both negative and positive sentiment in equal measure were removed. The sentences not removed were randomly split between Training-1 and TEST sets, except for the 43 sentences out of the 50 double-annotated sentences for which the annotators were in agreement. These 43 sentences were all added to the TEST set.

The Training-1 set contained 247 sentences, and the TEST set contained 281 sentences. Annotation results of the Training-1 set indicate that 39% of its sentences were classified as being neutral, 35% of its sentences were classified as being of positive sentiment, and 26% of its sentences were classified as being of negative sentiment.

In order to better train the machine learning system, it may be desirable to compile more training data. Towards this end, in this example, Training-2 and Training-3 sets were created. Both of these training sets were created to have approximately the same percentage of positive, negative, and neutral sentences as the Training-1 set (39% neutral, 35% positive, 26% negative).

The Training-2 set was created by adding to the Training-1 set. In order to add to the Training-1 set, the lexicon development sentences were used again. As noted above, the lexicon development sentences are biased towards sentences having positive and negative polarity. Thus, the Training-1 set contains a significantly higher proportion of neutral sentences than the lexicon development sentences. To create the Training-2 set to have the desired percentages of positive, negative, and neutral sentences to match the Training-1 set, all neutral sentences from the lexicon development sentences were collected, along with a smaller number of its positive and negative sentences. The Training-2 set thus consisted of the Training-1 sentences, augmented by the sentences collected from the lexicon development sentences. The Training-2 set contained 482 sentences, nearly double the size of the Training-1 set.

The Training-3 set was also created to maintain the approximate balance of positive, negative, and neutral sentences contained in the Training-1 set. To gather neutral sentences for the Training-3 set, the following steps were taken. First, 1000 sentences were randomly sampled with the condition that none of the sampled sentences contain any word from the baseline lexicon. This was done to obtain a higher percentage of neutral sentences in the sample. Second, these 1000 sentences were annotated manually by three persons using a crowdsourcing technique. All sentences with a majority vote of "neutral" out of three annotator labels were considered to be acceptable neutral sentences. The Training-3 set thus consisted of these acceptable neutral sentences along with the appropriate number of positive and negative sentences from the lexicon development sentences that were not used in the Training-2 set. The Training-3 set contained 1631 sentences.

FIG. 5 is a table summarizing sizes of three training sets and a test set used for performing an exemplary evaluation of lexicons without intensity values.

Having generated training and test data, evaluation of the subjectivity lexicons was performed in this example. All subjectivity lexicons noted above were evaluated: the seed lexicon, the raw expanded lexicons (Raw WN, Raw Lin, Raw Para), the manually-cleaned expanded lexicons (Cleaned WN, Cleaned Lin, Cleaned Para), and the automatically-cleaned expanded lexicons (Raw WN+Raw Lin, Raw WN+Raw Para, Raw Lin+Raw Para).

The machine learning tool C5.0 by Ross Quinlan is a decision-tree classifier used for the first evaluation. The C5.0 tool was given the Training-1, Training-2, and Training-3 sets, along with the subjectivity lexicons, for training purposes. After training the machine learning system and evaluating the accuracy of the subjectivity lexicons with respect to the three training sets, the subjectivity lexicon with the highest accuracy was blind-tested using the TEST set.

For the first evaluation of the subjectivity lexicons in this example, intensity values were not used. A lexicon was thus evaluated using only its list of words and the words' associated polarity classifications. For this first evaluation, each lexicon was represented by just two features: (1) the number of positive words in a sentence, and (2) the number of negative words in the sentence. These features provide the highest accuracies. For instance, features corresponding to the difference between the number of positive and negative words in a sentence have been evaluated but were found to result in lower accuracy. This is relevant since a sentence with a positive polarity, for instance, can contain negative words. It may be hypothesized that a large difference in counts might help to predict the dominant polarity, but adding this difference feature does not tend to boost performance.

FIG. 6 is a table summarizing the accuracy of an exemplary sentence-level classification performed without intensity values, with respect to the three training sets in this example. In generating the accuracy values of FIG. 6, the machine learning system was tasked with determining the polarity of a given sentence (positive, negative, neutral). In FIG. 6, the best three runs for the lexicons are underlined and marked with an asterisk. As noted above, no intensity values are used for this first classification; rather, the C5.0 classifier merely used counts of positive and negative words as features, across the various lexicons and across the three cumulatively larger training sets with the same polarity distributions. The majority baseline entry in FIG. 6, 0.390, was the same for all of the training sets and corresponded to the proportion of neutral sentences contained within each training set.

Following training, the lexicon with the highest accuracy with respect to the Training sets, Raw WN+Raw Para (Training-3 set, accuracy of 0.556), was evaluated on the TEST set in this example. For this lexicon, the following values are the Precision, Recall, and F-measures for the positive, negative, and neutral categories: POSITIVE: P=0.58, R=0.46, F=0.51; NEGATIVE: P=0.49, R=0.34, F=0.40; NEUTRAL: P=0.56, R=0.73, F=0.63.

As is evident from FIG. 6, the top three runs of the expanded lexicons all outperform the best run for the seed lexicon (0.520 vs. 0.556, 0.545, 0.538). Further, the top three lexicons have accuracy values on par with or better than the state-of-art MPQA and General Inquirer lexicons. It is also noted that two of the top-performing lexicons (Raw WN+Raw Lin and Raw WN+Raw Para) were cleaned up using the automated method of combining lexicons produced by different expansion strategies. This automated method thus produced results comparable to or better than manual clean-up methods. This result also suggests that the different expansion strategies are complementary and that combining multiple lexicons is useful.

FIG. 6 further illustrates that the best accuracy was obtained using the Raw WN+Raw Para lexicon, which suggests that a paraphrase generation system developed on out-of-domain data can be effective for expansion of a subjectivity lexicon. As noted above, this is the first reported use of a paraphrase generation system for building a subjectivity lexicon for use in a sentiment analysis system.

FIG. 6 also illustrates that accuracy improvement with the size of the training set data is not consistent. The reason for this may lie in the variability of the data used. The data were sampled from a large pool of materials as diverse as argumentative essays on general topics and technical essays from accounting exams. As described above, the balance of positive, negative, and neutral polarity sentences was maintained across the Training-1, Training-2, and Training-3 sets. However, this may not be sufficient for effective utilization of the training data, as the Training-2 and Training-3 sets may nonetheless contain materials that differ substantially in type from the Training-1 and TEST data. To overcome this, it may be desirable to use a different model for every essay type or to use a much larger sample of training sentences that represents all the different sub-types of essays. Further, the particulars of the sampling procedure may require investigation. For example, the neutral sentences added in the Training-2 set might be more difficult than those in the Training-1 and TEST sets, if, for example, they contain distracters (sentiment words from the baseline lexicon) (e.g., compare "Could there be a reason for the participants of the study to say they are eating healthier?" which includes a generally positive term, "healthier," to "To end the inning you have to get three outs," which contains no sentiment vocabulary).

Sentence-Level Classification Performed Using Intensity Values

For the second evaluation, lexicons were evaluated using the assigned intensity values for each of the three polarity classes. As noted above, the present example utilizes intensity values in which each word has an intensity value for each of the three polarity classes (positive, negative, and neutral). This system outperforms a system that adopts the conventional notion in which words are assigned membership within only a single polarity class.

A training dataset and a test dataset were created for this second evaluation in this example. The training set consisted of 1681 sentences sampled from 1000 essays. The essays were sampled from data sets of native and non-native speaker writing from standardized testing environments, from K-12 through graduate school level. Essay genres included persuasive, expository, narrative, and summary writing. In terms of annotation, 1126 sentences were manually annotated with positive, negative, and neutral labels by two persons trained using a formal protocol describing the task. An additional 555 sentences were manually annotated using a crowdsourcing method. These 1126 and 555 sentences comprised the 1681 sentence training set used for the second evaluation.

An additional 281 sentences were used to create a TEST-2 dataset in this example. These sentences were manually annotated by the two persons that annotated the aforementioned 1126 sentences. Of the 281 sentences, 50 sentences were annotated by both researchers. A high inter-annotator agreement value (kappa) is desirable (i.e., agreement with respect to 43 sentences or more). All of the agreed-upon double annotated items were included in the TEST-2 dataset.

The distribution of neutral, positive, and negative sentences in the training set and the TEST-2 set was 39%, 35%, and 26%, respectively. This appears to be the distribution of sentence polarity in the essay data, generally.

Having generated training and test data, evaluation of subjectivity lexicons was performed. For this evaluation, three subjectivity lexicons were evaluated: the seed lexicon, the combined lexicon, and the Raw Para lexicon. As noted above, the combined lexicon consists of 4900 words, with each word having three intensity values indicating the word's likelihood of being positive, negative, or neutral. The seed lexicon and Raw Para lexicon are two of the constituent parts of the combined lexicon, and the words of both of these lexicons also have intensity values for each of the three polarities.

Three machine learning tools were used in this second evaluation: the C50, support vector machine (SVM), and logistic regression machine learning systems. Multiple machine learning systems were used to determine if different learning systems affect performance and also to see if the performance trends were consistent across learning systems. It is observed that the three machine learning systems have fairly competitive results, and the trends were substantially identical in this example.

FIG. 7 is a table listing three exemplary feature sets used for training machine learning systems and their associated feature descriptions in this example. For the second evaluation, three distinct feature sets were used for each lexicon and each machine learning system: (1) a Baseline system, where each lexicon was represented by two features, the number of positive words in a sentence and the number of negative words in the sentence (because no intensity values are used, the Baseline system corresponds to the system used in the first evaluation); (2) a Sums system, where each lexicon was represented by two features, the sum of positive intensity values for sentiment words in a sentence and the sum of negative intensity values for sentiment words in the sentence; and (3) a Binning system, where each lexicon was represented by ten features, each of which corresponds to a number of raw counts of sentiment words in a sentence that have intensity values within a defined intensity range.

FIG. 8 is a table depicting accuracy results for an exemplary sentiment analysis system for performing a sentence-level sentiment assignment task in this example, where intensity values were used. Thus, the entries in FIG. 8 result from the system being tasked with determining whether a given sentence contains sentiment or not.

FIG. 9 is a table depicting accuracy results for an exemplary sentiment analysis system for performing a sentence-level polarity assignment task in this example, where intensity values were used. Thus, the entries in FIG. 9 result from the system being tasked with determining whether a sentence is of positive, negative, or neutral polarity.

In FIGS. 8 and 9, competitive best performance for each system was achieved using the Raw Para lexicon and the COMBINED Lexicon with the Binning feature set. This performance trend was consistent across machine learning systems. The largest lexicon in this evaluation, the COMBINED Lexicon, underperformed when using the Baseline feature set which simply counts occurrences of positive and negative words without considering intensity values. Results were inconsistent for the Sums feature set where intensity values are used in the summing heuristic. For the Binning feature set, softer membership of values in a range appeared to yield the best system performance.

The Baseline system's results with the three lexicons was compared with the Baseline system's results using the MPQA lexicon (the MPQA lexicon does not use intensity values, hence the comparison made using the Baseline system). Using C50, Baseline system performance with the MPQA lexicon was 64.4 for sentiment assignment, and 54.4 for polarity assignment. The three lexicons did not outperform the MPQA in the Baseline system comparison, but use of the Binning system's intensity value bins did produce consistently better results with the Seed Lexicon, Raw Para lexicon, and COMBINED Lexicon.

Figure 10:
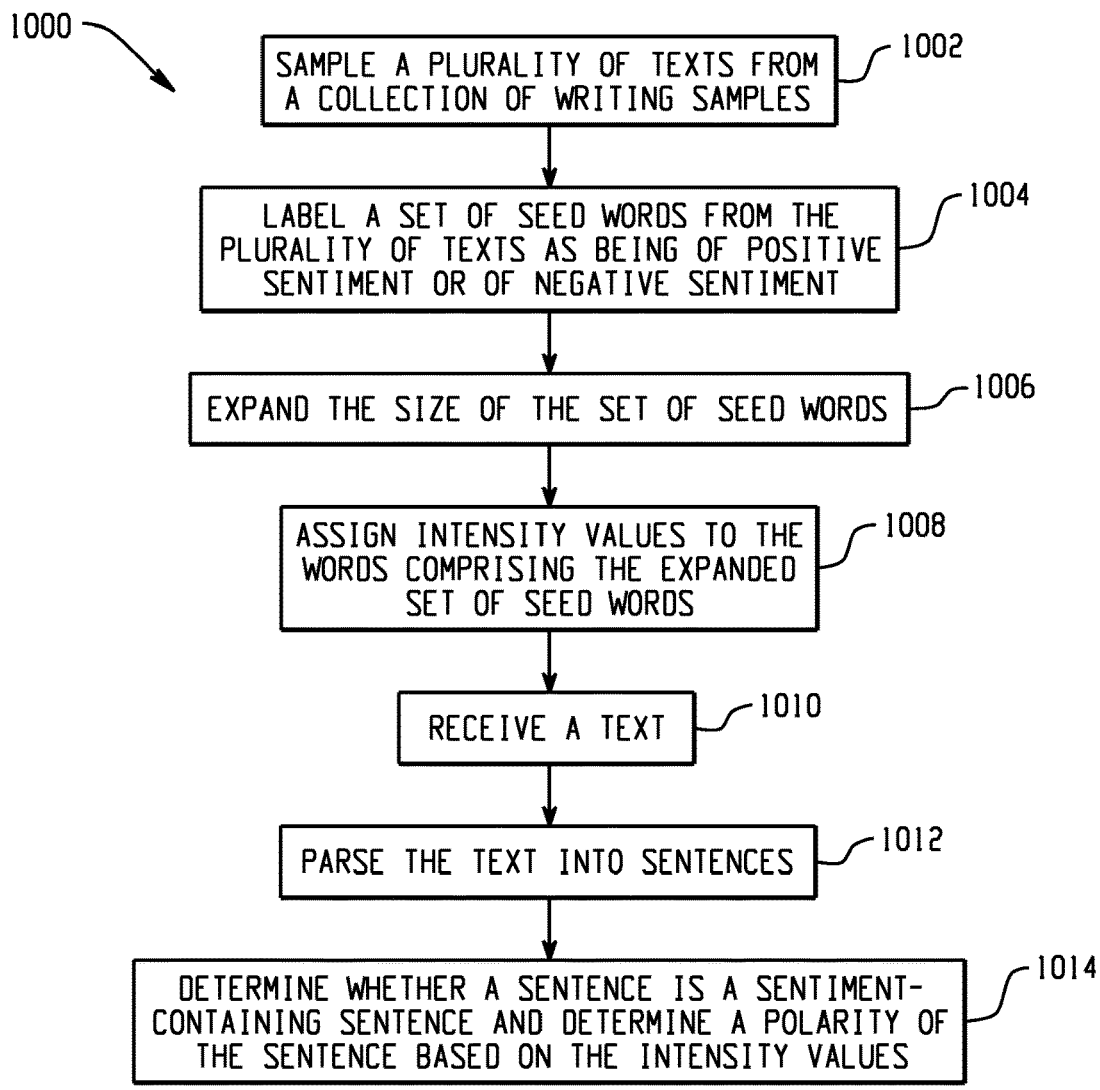
FIG. 10 is a flowchart depicting an exemplary method of building and using a subjectivity lexicon with intensity values.

FIG. 10 is a flowchart depicting an exemplary method of building and using a subjectivity lexicon with intensity values. The method can be carried out by any suitable computer processing system as described elsewhere herein. At 1002, a processing system samples a plurality of texts from a collection of writing samples. At 1004, the processing system labels a set of seed words from the plurality of texts as being of positive sentiment or of negative sentiment. At 1006, the processing system expands the size of the set of seed words using one or more automated expansion techniques. At 1008, the processing system assigns intensity values to the words comprising the expanded set of seed words. Each word is assigned a value corresponding to the strength of the word's association with a positive polarity class, a value corresponding to the strength of the word's association with a negative polarity class, and a value corresponding to the strength of the word's association with a neutral polarity class. At 1010, the processing system receives a text to be evaluated. At 1012, the processing system parses the text into sentences. At 1014, the processing system determines whether a sentence is a sentiment-containing sentence, and if so, determines a sentiment polarity of the sentence based on the intensity values.

Figure 11:
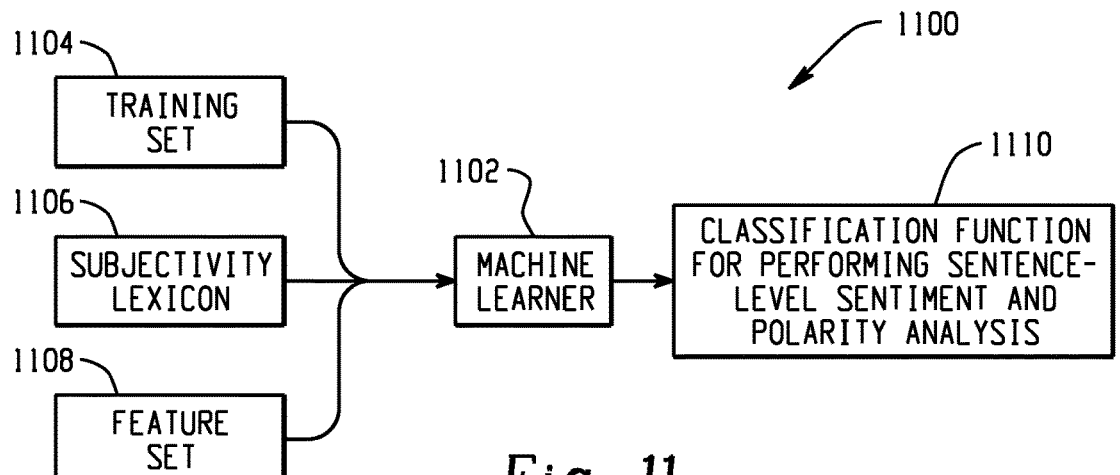
FIG. 11 depicts input and output features of an exemplary sentiment analysis system.

FIG. 11 depicts input and output features of an exemplary sentiment analysis system. A machine learning system 1102 (implemented via a computer processing system) uses a number of inputs to produce an output used to determine whether a sentence contains sentiment and the polarity of a sentiment-containing sentence. The first input is a set of training data 1104. The set of training data 1104 comprises a group of sentences of pre-determined sentiment and sentiment polarity. The second input is a subjectivity lexicon 1106 that is comprised of a list of words and intensity values for each word in the list. Each word in the subjectivity lexicon 1106 has an intensity value for a positive polarity class, a negative polarity class, and a neutral polarity class. The third input is a feature set 1108 that is comprised of a list of criteria used to instruct the machine learning system as to what parts of the set of training data and what parts of the subjectivity lexicon to use in generating the output. These criteria may include the feature descriptions illustrated in FIG. 7, which may instruct the machine learning system to consider, for example, a sum of positive intensity values for words in the subjectivity lexicon in the sentence and a sum of negative intensity values for words in the subjectivity lexicon in the sentence. The output of the machine learning system is a classification function 1110 used to determine whether a sentence contains sentiment and the polarity of a sentiment-containing sentence.

Figure 12A:
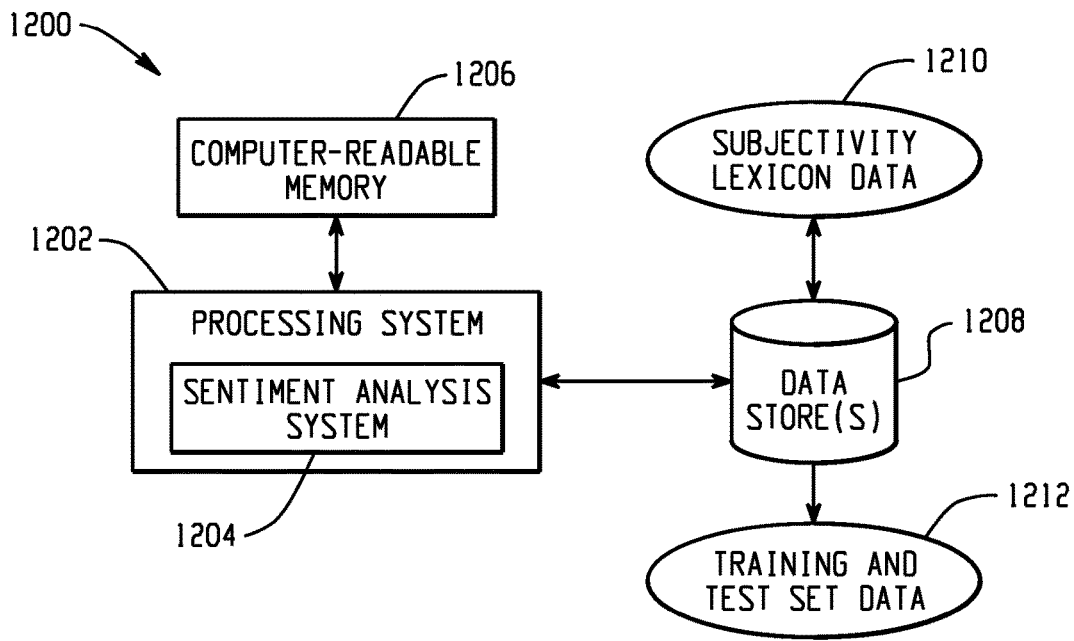
FIGS. 12A, 12B, and 12C depict example systems for use in implementing a sentiment analysis system.
Figure 12B:
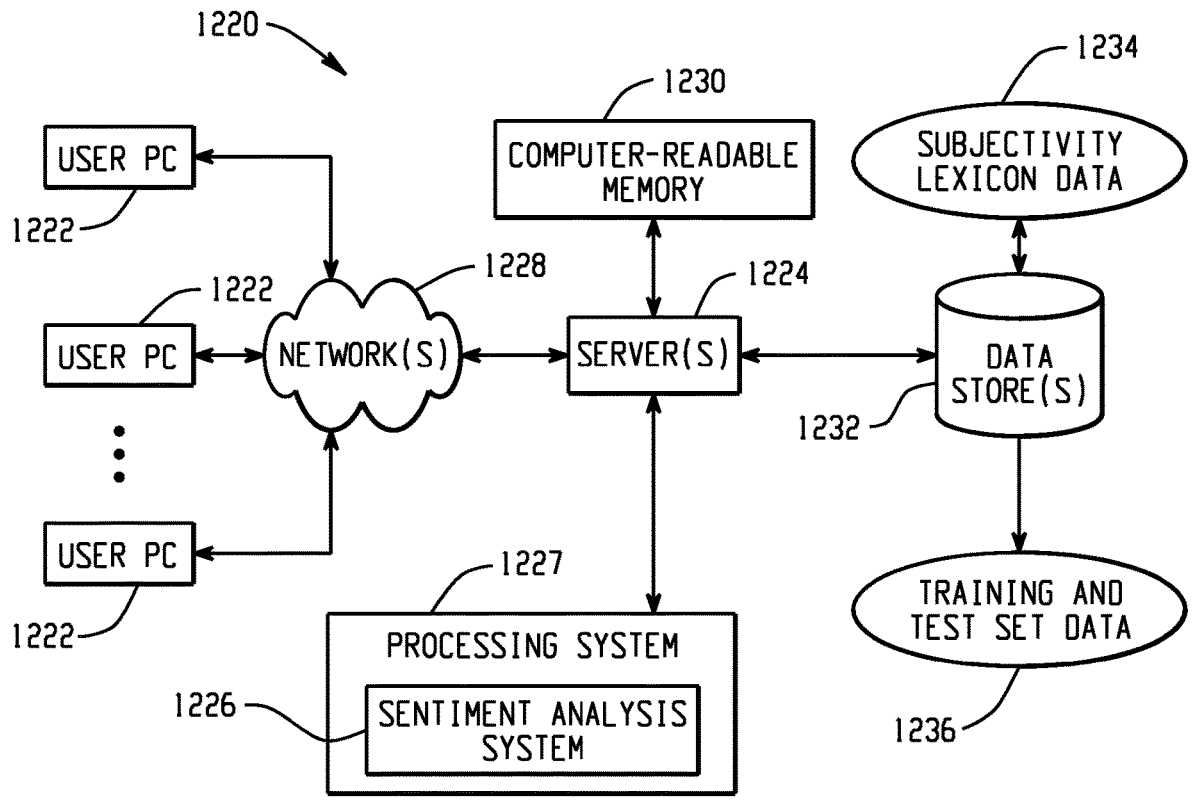
Figure 12C:
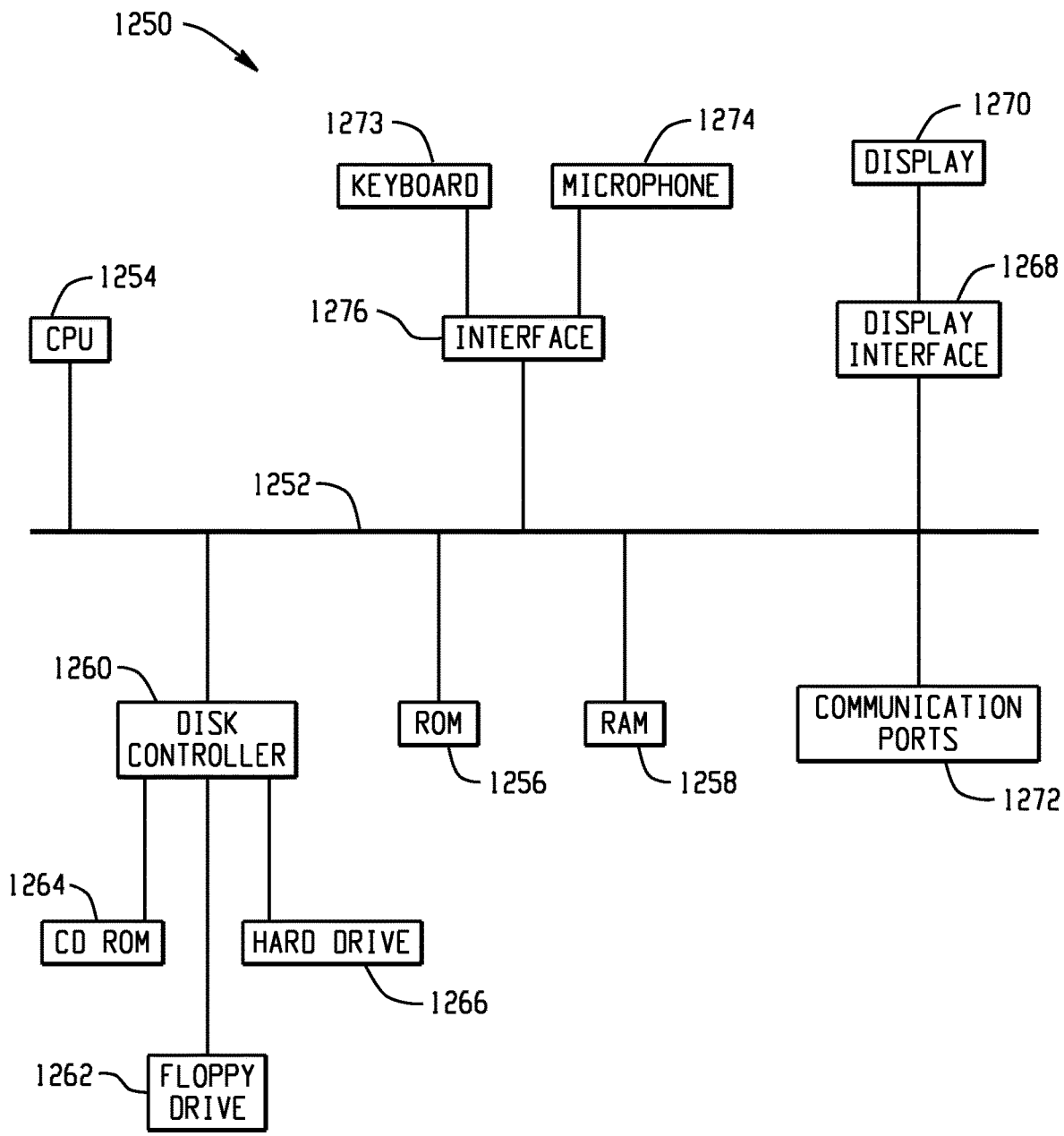

FIGS. 12A, 12B, and 12C depict example systems for use in implementing a sentiment analysis system. For example, FIG. 12A depicts an exemplary system 1200 that includes a standalone computer architecture where a processing system 1202 (e.g., one or more computer processors located in a given computer or in multiple computers that may be separate and distinct from one another) includes a sentiment analysis system 1204 being executed on it. The processing system 1202 has access to a computer-readable memory 1206 in addition to one or more data stores 1208. The one or more data stores 1208 may include subjectivity lexicon data 1210 as well as training and test set data 1212.

FIG. 12B depicts a system 1220 that includes a client server architecture. One or more user PCs, 1222 access one or more servers 1224 running a sentiment analysis system 1226 on a processing system 1227 via one or more networks 1228. The one or more servers 1224 may access a computer readable memory 1230 as well as one or more data stores 1232. The one or more data stores 1232 may contain subjectivity lexicon data 1234 as well as training and test set data 1236.

FIG. 12C shows a block diagram of exemplary hardware for a standalone computer architecture 1250, such as the architecture depicted in FIG. 12A that may be used to contain and/or implement the program instructions of system embodiments of the present invention. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A processor-readable storage medium, such as read only memory (ROM) 1256 and random access memory (RAM) 1258, may be in communication with the processing system 1254 and may contain one or more programming instructions for performing the method of implementing an assessment-enabled e-book. Optionally, program instructions may be stored on a non-transitory computer readable storage medium such as a magnetic disk, optical disk, recordable memory device, flash memory, or other physical storage medium.

A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1252 to be displayed on a display 1270 in audio, graphic, or alphanumeric format. Communication with external devices may optionally occur using various communication ports 1272.

In addition to the standard computer-type components, the hardware may also include data input devices, such as a keyboard 1273, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer implemented method of automatically building a set of seed words for a subjectivity lexicon for computerized detection of sentiment in writing, the method comprising:

receiving a plurality of texts in a first language from a collection of writing samples with a computer system;

selecting multiple sentences that contain at least one sentiment-containing word from the plurality of texts;

labeling a set of sentiment-containing seed words in the first language from the multiple sentences as being of positive sentiment or of negative sentiment with the computer system;

expanding the size of the set of sentiment-containing seed words in the first language with the computer system to provide a first expanded set of sentiment-containing seed words in the first language, wherein said expanding includes:

(i) accessing a bilingual corpus of documents, wherein the bilingual corpus includes a plurality of complete sentences, wherein each of the complete sentences is stored in both the first language and a second language that is different than the first language to form aparallel corpus of sentences;

(ii) after accessing the bilingual corpus of documents, extracting new words in the second language from the bilingual corpus that correspond to words in the first language in the set of sentiment-containing seed words, and (iii) after extracting the words in the second language, translating the words extracted from the bilingual corpus in the second language into the first language, wherein the translated words are paraphrases of the sentiment-containing words in the first language and are compiled into the first expanded set of sentiment-containing seed words in the first language, filtering the expanded size of the set of sentiment-containing seed words in the first language with the computer system to remove undesired words, the filtering comprising removing antonyms in the expanded size of the set of sentiment-containing seed words and/or eliminating words in the expanded size of the set of sentiment-containing seed words that do not match a tense of a corresponding sentiment-containing seed word; and storing the filtered, first expanded set of sentiment-containing seed words on a non-transitory computer-readable medium, wherein the subjectivity lexicon is generated based on the first expanded set of seed words by assigning numerical intensity values to individual words of the first expanded set of seed words, wherein each of the words of the first expanded set of seed words is assigned a first numerical intensity value corresponding to the strength of the word's association with a positive polarity class, a second numerical intensity value corresponding to the strength of the word's association with a negative polarity class, and a third numerical intensity value corresponding to the strength of the word's association with a neutral polarity class.

2. The method of claim 1, wherein the translating includes using a dictionary to translate words in the second language into the first language.

3. The method of claim 1, further comprising:
generating a second expanded set of seed words using a lexical database, wherein the generating of the second expanded set of seed word includes extracting synonyms of each seed word from the lexical database.

4. The method of claim 3, further comprising:
performing an automated clean-up procedure on the first and second expanded sets of seed words to remove undesired words, wherein the automated clean-up procedure comprises removing words that are not included in both the first and second expanded sets of seed words.

5. The method of claim 1, further comprising:
generating a second expanded set of seed words using a proximity-based thesaurus, wherein the generating of the second expanded set of seed word includes extracting synonyms of each seed word from the proximity-based thesaurus.

6. The computer implemented method of claim 1, wherein the paraphrases are single-word paraphrases, and
the expanding further includes excluding the paraphrases from the first expanded set of sentiment-containing seed words that are morphological variants of words in the set of sentiment-containing seed words.

7. The computer implemented method of claim 1, wherein the multiple sentences that contain at least one sentiment-containing word from the plurality of texts are selected either automatically using a computer or manually using a humanannotator.

8. A computer-implemented method comprising:
receiving a plurality of texts in a first language from a collection of writing samples with a computer system;
selecting multiple sentences that contain at least one sentiment-containing word from the plurality of texts;
labeling a set of sentiment-containing seed words in the first language from the multiple sentences as being of positive sentiment or of negative sentiment with the computer system;
expanding the size of the set of sentiment-containing seed words in the first language with the computer system to provide an expanded set of sentiment-containing seed words in the first language, wherein said expanding includes:
  (i) accessing a bilingual corpus of documents, wherein the bilingual corpus includes a plurality of complete sentences, wherein each of the complete sentences is stored in both the first language and a second language that is different than the first language to form a parallel corpus of sentences:
  (ii) after accessing the bilingual corpus of documents, extracting distinct new words in the second language from the bilingual corpus that correspond to distinct words in the first language in the set of sentiment-containing seed words; the distinct new words in the second language being synonyms for the distinct words in the first language, and
  (iii) after extracting the words in the second language, translating each of the distinct new words in the second language extracted from the bilingual corpus into distinct new words in the first language, wherein the translated words are new synonyms of each of the sentiment-containing words in the first language and are compiled into the first expanded set of sentiment-containing seed words in the first language, wherein the translated words expand the size of unique sentiment-containing seed words in the first language with new synonyms of each of the sentiment-containing words in the first language;
further expanding the expanded set of sentiment-containing seed words using a proximity-based thesaurus, wherein synonyms of each seed word are extracted from the proximity-based thesaurus and placed into the expanded set of sentiment-containing seed words;
filtering the expanded size of the set of sentiment-containing seed words in the first language with the computer system to remove undesired words, the filtering comprising removing antonyms in the expanded size of the set of sentiment-containing seed words and/or eliminating words in the expanded size of the set of sentiment-containing seed words that do not match a tense of a corresponding sentiment-containing seed word; and
storing the expanded set of sentiment-containing seed words on a non-transitory computer-readable medium;
generating a subjectivity lexicon comprising a list of words and numerical intensity values for each word in the list, wherein the subjectivity lexicon is generated by assigning numerical intensity values to individual words of the expanded set of sentiment-containing seed words, wherein each of the words of the expanded set of sentiment-containing seed words is assigned a first numerical intensity value corresponding to the strength of the word's association with a positive polarity class, a second numerical intensity value corresponding to the strength of the word's association with a negative polarity class, and a third numerical intensity value corresponding to the strength of the word's association with a neutral polarity class;
providing a training set of data as a first input to a machine learning system comprising a processing system and a memory, the processing system configured to accept a number of inputs and produce an output, the training set of data comprising a group of sentences of pre-determined sentiment and sentiment polarity;
providing the list of words and the numerical intensity values of the subjectivity lexicon as a second input to the machine learning system; and
generating a feature set comprising a list of criteria used to instruct the machine learning system as to what parts of the training set and what parts of the subjectivity lexicon to use in generating the output of the machine learning system, wherein the feature set is a third input to the machine learning system,
wherein the machine learning system is configured to determine whether a sentence contains sentiment and determine a polarity of a sentiment-containing sentence.

9. The method of claim 8, wherein the feature set comprising a binning system, the binning system comprising:

raw counts of words in a sentence from the subjectivity lexicon with intensity values greater than or equal to 0.0 and less than or equal to 0.2 for positivity;

raw counts of words in the sentence from the subjectivity lexicon with intensity values greater than 0.2 and less than or equal to 0.4 for positivity;

raw counts of words in the sentence from the subjectivity lexicon with intensity values greater than 0.4 and less than or equal to 0.6 for positivity;

raw counts of words in the sentence from the subjectivity lexicon with intensity values greater than 0.6 and less than or equal to 0.8 for positivity;

raw counts of words in the sentence from the subjectivity lexicon with intensity values greater than 0.8 and less than or equal to 1.0 for positivity;

raw counts of words in the sentence from the subjectivity lexicon with intensity values greater than or equal to 0.0 and less than or equal to 0.2 for negativity;

raw counts of words in the sentence from the subjectivity lexicon with intensity values greater than 0.2 and less than or equal to 0.4 for negativity;

raw counts of words in the sentence from the subjectivity lexicon with intensity values greater than 0.4 and less than or equal to 0.6 for negativity;

raw counts of words in the sentence from the subjectivity lexicon with intensity values greater than 0.6 and less than or equal to 0.8 for negativity; and raw counts of words in the sentence from the subjectivity lexicon with intensity values greater than 0.8 and less than or equal to 1.0 for negativity.

10. The method of claim 8, wherein the third numerical intensity value has a value between 0.0 and 1.0.

11. The method of claim 8, wherein
the first, second, and third numerical intensity values are determined using a manual annotation process,
each word is annotated by multiple annotators, and
an inter-annotator agreement value is used to determine the intensity values.

12. The method of claim 11, wherein the manual annotation process is a crowdsourcing technique, and each word is annotated by at least twenty annotators.

13. The computer implemented method of claim 8,
wherein the paraphrases are single-word paraphrases, and the expanding further includes excluding the paraphrases from the first expanded set of sentiment-containing seed words that are morphological variants of words in the set of sentiment-containing seed words.

14. The computer implemented method of claim 8, wherein
the multiple sentences that contain at least one sentiment-containing word from the plurality of texts are selected either automatically using a computer or manually using a human annotator.

15. A computer implemented method of automatically building a set of seed words for a subjectivity lexicon for computerized detection of sentiment in writing, the method comprising:

receiving a plurality of texts in a first language from a collection of writing samples with a computer system;

selecting multiple sentences that contain at least one sentiment-containing word from the plurality of texts;

labeling a set of sentiment-containing seed words in the first language from the multiple sentences as being of positive sentiment or of negative sentiment with the computer system;

expanding the size of the set of sentiment-containing seed words in the first language with the computer system to provide a first expanded set of sentiment-containing seed words in the first language, wherein said expanding includes:
(i) accessing a bilingual corpus of documents, wherein the bilingual corpus includes a plurality of complete sentences, wherein each of the complete sentences is stored in both the first language and a second language that is different than the first language to form aparallel corpus of sentences
(ii) after accessing the bilingual corpus of documents, extracting new words in the second language from the bilingual corpus that correspond to words in the first language in the set of sentiment-containing seed words, and
(iii) after extracting the words in the second language, translating the words the extracted from the bilingual corpus in the second language into the first language, wherein the translated words are paraphrases of the sentiment-containing words in the first language and are compiled into the first expanded set of sentiment-containing seed words in the first language;

filtering the expanded size of the set of sentiment-containing seed words in the first language with the computer system to remove undesired words, the filtering comprising removing antonyms in the expanded size of the set of sentiment-containing seed words and/or eliminating words in the expanded size of the set of sentiment-containing seed words that do not match a tense of a corresponding sentiment-containing seed word; and storing the filtered, first expanded set of sentiment-containing seed words on a non-transitory computer-readable medium, wherein the subjectivity lexicon is generated based on the first expanded set of seed words by assigning numerical intensity values to individual words of the first expanded set of seed words, wherein each of the words of the first expanded set of seed words is assigned a first numerical intensity value corresponding to the strength of the word's association with a positive polarity class, a second numerical intensity value corresponding to the strength of the word's association with a negative polarity class, and a third numerical intensity value corresponding to the strength of the word's association with a neutral polarity class.

* * * * *